US010846089B2

(12) United States Patent
Robinson et al.

(10) Patent No.: US 10,846,089 B2
(45) Date of Patent: Nov. 24, 2020

(54) UNIFIED LOGIC FOR ALIASED PROCESSOR INSTRUCTIONS

(71) Applicant: MIPS Tech, LLC, Santa Clara, CA (US)

(72) Inventors: James Hippisley Robinson, New York, NY (US); Morgyn Taylor, San Jose, CA (US)

(73) Assignee: MIPS Tech, LLC, Santa Clara, CA (US)

( * ) Notice: Subject to any disclaimer, the term of this patent is extended or adjusted under 35 U.S.C. 154(b) by 7 days.

(21) Appl. No.: 16/119,487

(22) Filed: Aug. 31, 2018

(65) Prior Publication Data
US 2019/0065145 A1  Feb. 28, 2019

Related U.S. Application Data

(60) Provisional application No. 62/552,855, filed on Aug. 31, 2017, provisional application No. 62/552,796, (Continued)

(51) Int. Cl.
*G06F 5/01* (2006.01)
*G06F 9/30* (2018.01)
(Continued)

(52) U.S. Cl.
CPC ............ *G06F 9/30167* (2013.01); *G06F 5/01* (2013.01); *G06F 9/30014* (2013.01);
(Continued)

(58) Field of Classification Search
CPC .................................. G06F 5/01; G06F 5/012
(Continued)

(56) References Cited

U.S. PATENT DOCUMENTS 4,829,460 A * 5/1989 Ito ........................... G06F 5/015
377/69
5,978,822 A * 11/1999 Muwafi ................... G06F 5/015
708/209
(Continued)

FOREIGN PATENT DOCUMENTS

EP           2691850 B1      5/2018

OTHER PUBLICATIONS

Collins J. et al, "Pointer cache assisted prefetching", Proc. 35th AnnuaiiEEE/ACM International Symposium on Microarchitecture Nov. 18-22, 2002, pp. 62-73.

*Primary Examiner* — Andrew Caldwell
*Assistant Examiner* — Emily E Larocque
(74) *Attorney, Agent, or Firm* — Adams Intellex, PLC

(57) ABSTRACT

A binary logic circuit for manipulating an input binary string includes a first stage of a first group of multiplexers arranged to select respective portions of an input binary string and configured to receive a respective first control. A second stage is included in which a plurality of a second group of multiplexers is arranged to select respective portions of the input binary string and configured to receive a respective second control signal. The control signals are provided such that each multiplexer of a second group is configured to select a respective second portion of the first binary string. Control circuitry is configured to generate the first and second control signals such that two or more of the first groups and/or two or more of the second groups of multiplexers are independently controllable.

22 Claims, 8 Drawing Sheets

Related U.S. Application Data filed on Aug. 31, 2017, provisional application No. 62/552,841, filed on Aug. 31, 2017, provisional application No. 62/552,830, filed on Aug. 31, 2017, provisional application No. 62/558,930, filed on Sep. 15, 2017.

(51) Int. Cl.
*G06F 9/32* (2018.01)
*G06F 9/34* (2018.01)
*G06F 9/355* (2018.01)
*G06F 9/38* (2018.01)

(52) U.S. Cl.
CPC ........ *G06F 9/3016* (2013.01); *G06F 9/30036* (2013.01); *G06F 9/30043* (2013.01); *G06F 9/30112* (2013.01); *G06F 9/30134* (2013.01); *G06F 9/30145* (2013.01); *G06F 9/30149* (2013.01); *G06F 9/30192* (2013.01); *G06F 9/324* (2013.01); *G06F 9/342* (2013.01); *G06F 9/355* (2013.01); *G06F 9/3861* (2013.01); *G06F 9/30032* (2013.01); *G06F 9/30163* (2013.01)

(58) Field of Classification Search
USPC .......................................................... 708/209
See application file for complete search history.

(56) References Cited

U.S. PATENT DOCUMENTS

| | | | |
|---|---|---|---|
| 6,006,244 A * | 12/1999 | Mahurin | G06F 7/762 708/209 |
| 6,578,094 B1 | 6/2003 | Moudgill | |
| 7,320,013 B2 * | 1/2008 | Mukund | G06F 5/01 708/209 |
| 7,558,939 B2 | 7/2009 | Banerjee et al. | |
| 7,610,473 B2 | 10/2009 | Kissell | |
| 9,086,906 B2 | 7/2015 | Patel et al. | |
| 9,235,510 B2 | 1/2016 | Patel et al. | |
| 9,652,240 B2 | 5/2017 | Jackson | |
| 9,792,123 B2 | 10/2017 | Manoukian | |
| 9,830,275 B2 | 11/2017 | Rozario et al. | |
| 9,870,225 B2 | 1/2018 | Sudhakar | |
| 2003/0018879 A1 | 1/2003 | Sahraoui et al. | |
| 2003/0105945 A1 | 6/2003 | Wolff et al. | |
| 2003/0131029 A1 | 7/2003 | Bandy et al. | |
| 2003/0161172 A1 | 8/2003 | Civlin | |
| 2004/0205409 A1 | 10/2004 | Wu et al. | |
| 2008/0104155 A1 * | 5/2008 | Whittaker | G06F 5/015 708/209 |
| 2008/0235491 A1 | 9/2008 | Svec et al. | |
| 2009/0138534 A1 * | 5/2009 | Lee | G06F 7/762 708/209 |
| 2014/0244987 A1 | 8/2014 | Garbacea et al. | |
| 2014/0250289 A1 | 9/2014 | Pota et al. | |

\* cited by examiner

UNIFIED LOGIC FOR ALIASED PROCESSOR INSTRUCTIONS

RELATED APPLICATIONS

This application claims the benefit of U.S. provisional patent applications "Implicit Global Pointer Relative Addressing for Global Memory Access" Ser. No. 62/552,855, filed Aug. 31, 2017, "Unified Logic" Ser. No. 62/552,796, filed Aug. 31, 2017, "Pointer-Size Controlled Instruction Processing" App. No. 62/552,841, filed Aug. 31, 2017, "Saving and Restoring Non-Contiguous Blocks of Preserved Registers" Ser. No. 62/552,830, filed Aug. 31, 2017, and "Unaligned Memory Accesses" Ser. No. 62/558,930, filed Sep. 15, 2017.

Each of the foregoing applications is hereby incorporated by reference in its entirety.

FIELD OF ART

This application relates generally to logic circuit design and more particularly to unified logic for aliased processor instructions.

BACKGROUND

People regularly interact with a wide variety of electronic systems. Common electronic systems include computers, smartphones, and tablet computers, while other electronic systems now appear in many familiar items, ranging from household appliances to vehicles. These electronic systems include integrated circuits or "chips" which, depending on the system in which the chips are used, can range from simple to highly complex. The chips are designed to perform a wide variety of system functions, and to enable the systems to perform their functions effectively and efficiently. The chips are built using highly complex circuit designs, architectures, and system implementations. The chips are, quite simply, integral to the electronic systems. The chips are designed to implement system functions such as user interfaces, communications, processing, and networking. These system functions are applied to electronic systems used for business, entertainment, or consumer electronics purposes. The electronic systems routinely contain more than one chip. The chips implement critical system functions including computation, storage, and control. The chips support the electronic systems by computing algorithms and heuristics, handling and processing data, communicating internally and externally to the electronic system, and so on. Since the numbers of computations and other functions that must be performed are large, any improvements in chip efficiency contribute to a significant and substantial impact on overall system performance. As the amount of data to be handled increases, the approaches that are used must not only be effective, efficient, and economical, but must also scale as the amount of data increases.

Single processor architectures based on chips are well suited for some computational tasks, but are unable to achieve the high-performance levels which are required by some high-performance systems. Multiple single processors can be used together to boost performance. Parallel processing based on general-purpose processors can attain an increased level of performance, thus parallelism is one approach for achieving increased performance. There is a wide variety of applications that demand high performance levels. Common applications requiring high performance include networking, image and signal processing, and large simulations, to name but a few. In addition to computing power, chip and system flexibility are important for adapting to ever-changing computational needs and technical situations.

System or chip reconfigurability is another approach that can address application demands. The system or chip attribute of reconfigurability is critical to many processing applications, as reconfigurable devices are extremely efficient for specific processing tasks. In certain circumstances, the cost and performance advantages of reconfigurable devices exist because the reconfigurable or adaptable logic enables program parallelism, which allows multiple computation operations to occur simultaneously. By comparison, conventional processors are often limited by instruction bandwidth and execution rate restrictions. Note that the high-density properties of reconfigurable devices can come at the expense of the high-diversity property that is inherent in other electronic systems, including microprocessors. Microprocessors have evolved to highly-optimized configurations that provide cost/performance advantages over reconfigurable systems for tasks that require high functional diversity. However, there are many tasks for which a conventional microprocessor is not the best design choice. A system architecture that supports configurable, interconnected processing elements can be an excellent alternative for many data-intensive applications such as Big Data.

SUMMARY

Unified logic for aliased processor instructions is disclosed. A single set of unified logic is used for multiple processor instruction aliases. Multiple sequential multiplexer stages are controlled by two or more independently controllable control signals. A method of manipulating an input binary string at a binary logic circuit is disclosed comprising: accessing a plurality of sequential multiplexer stages, wherein each stage has a plurality of groups of multiplexers; providing two or more control signals to each group of multiplexers of each stage, wherein at least two of the two or more control signals of at least one stage of multiplexers are independently controllable; receiving each control signal at a multiplexer of the respective group, wherein each multiplexer selects an input in dependence on the control signal provided to its group, and wherein each input of the multiplexer is arranged to receive a respective portion of the input binary string for the stage to which the multiplexer belongs; providing part of an output binary string for the stage to which the multiplexer belongs so as to shift the respective portion of the input binary string by a predefined number of bits relative to the input binary string; and providing the output binary string of one stage as the input binary string of the next stage in the sequence.

In embodiments, wherein each multiplexer selecting an input comprises each multiplexer selecting a respective first portion of the input binary string so as to perform a shift from a set of shifts for the stage, each shift of the first set is a shift by a fixed number of bits. In embodiments, the set of shifts for each stage comprises a shift by the predefined number of bits and a shift of zero. In embodiments, the predefined number of bits by which each stage shifts portions of the binary string produced by the previous stage is a power of 2, and wherein the predefined number of bits of consecutive further stages differ by a power of 2. Some embodiments further comprise producing an output binary string for the binary logic circuit by shifting all the bits of the binary string produced by the final stage in the sequence by either one bit or zero bits according to a single control signal.

In embodiments, the providing of the control signals comprises providing a combination of control signals configured to cause the binary logic circuit to perform one of reversing the bits of the binary input string, reversing the bytes of the binary input string, and reversing the bits within each byte of the binary input string.

In embodiments, a computer program product embodied in a non-transitory computer readable medium for manipulating an input binary string at a binary logic circuit, the computer program product comprising code which causes one or more processors to perform operations of: obtaining access to a plurality of sequential multiplexer stages, wherein each stage has a plurality of groups of multiplexers; providing two or more control signals to each group of multiplexers of each stage, wherein at least two of the two or more control signals of at least one stage of multiplexers are independently controllable; receiving each control signal at a multiplexer of the respective group, wherein each multiplexer selects an input in dependence on the control signal provided to its group, and wherein each input of the multiplexer being arranged to receive a respective portion of the input binary string for the stage to which the multiplexer belongs; providing part of an output binary string for the stage to which the multiplexer belongs so as to shift the respective portion of the input binary string by a predefined number of bits relative to the input binary string; and providing the output binary string of one stage as the input binary string of the next stage in the sequence.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
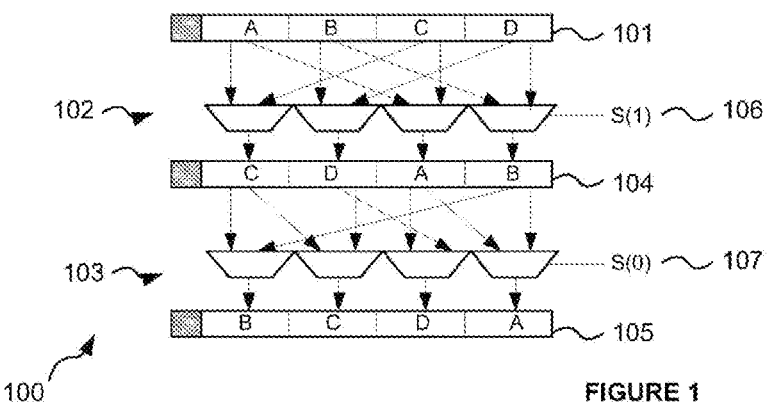
FIG. 1 shows an example 4-bit barrel shifter.

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Processor architectures have been routinely categorized by describing either the underlying hardware architecture or microarchitecture of a given processor, or by referencing the instruction set executed by the processor. The latter, the instruction set architecture (ISA), describes the types and ranges of instructions available, rather than describing how the instructions are implemented in hardware. The result is that for a given ISA, the ISA can be implemented using a wide range of techniques, where the techniques can be chosen based on preference or need for execution speed, data throughput, power dissipation, and manufacturing cost, among many other criteria. The ISA serves as an interface between code that is to be executed on the processor and the hardware that implements the processor. ISAs, and the processors or computers based on them, are partitioned broadly into categories including complex instruction set computers (CISC) and reduced instruction set computers (RISC). The ISAs define types of data that can be processed; the state or states of the processor, where the state or states include the main memory and a variety of registers; and the semantics of the ISA. The semantics of the ISA typically include modes of memory addressing and memory consistency. In addition, the ISA defines the instruction set for the processor, whether there are many instructions (complex) or fewer instructions (reduced), and the model for control signals and data that are input and output. RISC architectures have many advantages over processor design because by reducing the numbers and variations of instructions, the hardware that implements the instructions can be simplified. Further, compilers, assemblers, linkers, etc., that convert the code to instructions executable by the architecture can be simplified and tuned for performance.

In order for a processor to process data, the data must be made available to the processor or process. As discussed throughout, pointers can be used to share data between and among processors, processes, etc., by providing a reference address or pointer to the data. The pointer can be provided rather than transferring the data to each processor or process that requires the data. The pointers that are used for passing data references can be local pointers known only to a given, local processor or process, or can be global pointers. The global pointers can be shared among multiple processors or processes. The global pointers can be organized or grouped into a global pointer register. The registers can include general purpose registers, floating point registers, and so on. While operating systems such as Linux™ can use a global pointer for position independent code (PIC), the use of the global pointer implies that a particular register is explicitly used to support PIC handling and execution. In contrast, some RISC architectures may use instructions which implicitly reference a global pointer source. The global pointer (GP) source provides operands manipulated by the instructions. Use of instructions that implicitly use GP source operands allows bits within the instructions to be used for purposes other than explicitly referencing GP registers. The result of implicit GP source operands is that the instructions can free the bits previously used to declare the global pointer, and can therefore provide longer address offsets, extended register ranges, and so on.

A further capability of some architectures includes support of the rotate and exchange or ROTX instruction. This instruction can support a variety of data operations such as bit reversal, bit swap, byte reversal, byte swap, shifting, striping, and so on, all within one instruction. The use of the ROTX instruction provides a computationally inexpensive technique for implementing multiple instructions within one instruction. The rotate and exchange instruction can overlay a barrel shifter or other shifter commonly available in some architectures. Separately implementing these various rotate, exchange, or shift instructions would increase central processing unit (CPU) complexity because each instruction would have an impact on one or more aspects of the CPU design. By merging the various instructions into the ROTX instruction, CPU hardware that implemented the separate instructions can be combined to achieve a less complex processor.

Processors commonly include a "mode" designator to indicate that the mode in which a processor is operating is based on a number of bytes, words, and so on. For some processor architecture techniques, a mode can include a 16-bit operation, a 32-bit operation, a 64-bit operation, and so on. One or more bits within an instruction can be used to indicate the mode in which a particular instruction is to be executed. In contrast, if the processor is designed to operate without mode bits within each instruction, then the mode bits within each instruction can be repurposed. The repurposed bits within the instruction can be used to implement the longer address offsets or extended register ranges described elsewhere. When an operation "mode" is still needed for a particular operation, then instructions that are code-density oriented can be added. Specific instructions can be implemented for 16-bit, 32-bit, 64-bit, etc., operations when needed, rather than implementing every instruction to include bits to define a mode, or to evaluate whether the mode is relevant to the instruction.

Storage used by processors can be organized and addressed using a variety of techniques. Typically, the storage or memory is organized as groups of bytes, words, or some other convenient size. To make storage or memory access more efficient, the access acquires as much data as is reasonable with each access, thus reducing the numbers of accesses. Access to the memory is often most efficient in terms of computation or data transfer when the access is oriented or "aligned" to boundaries such as word boundaries. However, data to be processed does not always conveniently align to boundaries. For example, the operations to be performed by a processor may be byte oriented, the amount of data in memory may align to a byte boundary but not to a word boundary, and so on. Under certain conditions and depending on the implementation of the processor, accessing specific content such as a byte can require multiple read operations. To improve computational efficiency, unaligned memory access can be required. The unaligned memory access may be needed for computational if not access efficiency. A given instruction set architecture can support explicit unaligned storage or memory accesses. The general forms of the load and store instructions for the ISA can include unaligned load instructions and unaligned store instructions. The unaligned load instructions and the unaligned store instructions support a balance or tradeoff between increased density of the code that is executed by a processor and reduced processor complexity. The unaligned load instructions and the unaligned store instructions can be implemented in addition to the standard load instructions and store instructions, where the latter instructions align to boundaries such as word boundaries. When an unaligned load or store is performed, the "extra" data, such as bytes that can be accessed, can be held temporarily for potential use by a subsequent read or store instruction (e.g. data locality).

For various reasons, execution of code can be stopped at a point in time and restarted at a later point in time, after a duration of time, and so on. The stopping and restarting of code execution can result from an exception occurring, receiving a control signal such as a fire signal or done signal, detecting an interrupt signal, and so on. In order to efficiently handle save and restore operations, an instruction set architecture can include instructions and hardware specifically tuned for the save and the store operations. A save instruction can save registers, where the registers can be stored in a stack. The saved registers can include source registers. A stack pointer can be adjusted to account for the stored registers. The saving can also include storing a local stack frame, where a stack frame can include a collection of data (or registers) on a stack that is associated with an instruction, a subprogram call, a function call, etc., that caused the save operation. The restore operation can reverse the save technique. The registers that were saved by the save operation can be restored. The restored registers can include destination registers. When the registers have been restored, the restore operation can cause a jump to a return address. Code execution can continue beginning with the return address.

Modern processor instruction sets typically include a significant number of shift, rotate, and reverse instructions. Shift and rotate instructions can typically be carried out by a suitably configured barrel shifter, but reverse instructions often require separate dedicated logic. The logic required to implement all of these instructions will consume a significant processor area. In low-cost, low-power processors, such as embedded processors, it is desirable to minimize processor size. The present application describes a novel binary logic circuit which can combine the functionality of shifting and reversing, providing common logic which can be called by multiple different instructions of a processor instruction set.

FIG. 1 shows an example 4-bit barrel shifter. Barrel shifters are binary logic circuits configured to perform shift or rotate functions on a binary word. Barrel shifters can be implemented as a sequence of multiplexers arranged so as to achieve a predetermined shift or rotate of an input word. In the 4-bit barrel shifter 100, a 4-bit binary word 101 is operated on by a first set of multiplexers 102 so as to produce an intermediate 4-bit word 104. A second set of multiplexers 103 operates on the intermediate word 104 so as to produce a 4-bit output word 105. Each set of multiplexers is controlled by a respective control signal: S(1) 106 for the first set of multiplexers 102; and S(0) 107 for the second set of multiplexers 103. The control signal 106 determines whether each multiplexer of the first set selects an input bit offset by 2 bits in the input word 101, or passes through a respective input bit, maintaining its bit position. The control signal 107 determines whether each multiplexer of the second set selects an input bit offset by 1 bit in the intermediate word 104, or passes through a respective bit in the intermediate word, maintaining its bit position. All of the multiplexers of a given set act in unison according to their common control signal.

In FIG. 1, the 4-bit input word ABCD can be manipulated by the barrel shifter 100 to give four possible outputs according to the values of the control signals. These are set out below including the intermediate word:
1. ABCD>CDAB>BCDA; this example is shown in FIG. 1 and represents a rotation of the input word by 3 bits; in this case the controls bits are S(1)=S(0)=1 so as to cause each multiplexer to select an offset bit as indicated by the solid lines in FIG. 1.
2. ABCD>ABCD>DABC; rotation of the input word by 1 bit when the control bits are S(1)=0 and S(0)=1.

3. ABCD>CDAB>CDAB; rotation of bits by 2 bits when the control bits are S(1)=1 and S(0)=0.
4. ABCD>ABCD>ABCD; no modification of the input word when the control bits are S(1)=0 and S(0)=0.

By varying the number of stages of multiplexers and the number of multiplexers in each stage, barrel shifters can be adapted to operate on binary words of a range of lengths, for example, 32 bits or 64 bits, depending on the data path width of a processor. Additionally, by varying the inputs to the barrel shifter, it can be configured at design time to perform a range of different binary manipulations, such as rotations, left-shifts, and right-shifts of an input word. Barrel shifters are therefore common in processors, with multiple barrel shifters typically being available in a processor, each configured to perform a different hardware manipulation of binary values in response to instructions executing at the processor.

Another type of logic which may be found on a processor is reversing logic, which reverses the bytes or bits in a binary string. Such operations may be useful in a variety of data processing applications, including fast Fourier transforms and endianness swapping. Reversing logic has some elements in common with shifting logic, in that it will consist of multiplexers which are wired to select bits from different positions within the input bit string according to certain control signals. Usually, this reversing logic will be separate from shifting logic, and will require additional sets of multiplexers and controls.

There is provided a binary logic circuit for manipulating an input binary string, the binary logic circuit comprising: a first stage comprising a plurality of first groups of multiplexers arranged to select respective portions of an input binary string so as to produce a first binary string, each of the first groups of multiplexers being configured to receive a respective first control signal such that each multiplexer of a first group is configured to select a respective first portion of the input binary string in accordance with the first control signal provided to that first group in order to shift the bit position of that first portion relative to the input binary string; a second stage comprising a plurality of second groups of multiplexers arranged to select respective portions of the first binary string so as to produce a second binary string, each of the second groups of multiplexers being configured to receive a respective second control signal such that each multiplexer of a second group is configured to select a respective second portion of the first binary string in accordance with the second control signal provided to that second group in order to shift the bit position of that second portion relative to the first binary string; and control circuitry configured to generate the first and second control signals such that two or more of the first groups and/or two or more of the second groups of multiplexers are independently controllable.

Each multiplexer of the first stage may be arranged to, in accordance with its first control signal, select a respective first portion of the input binary string so as to perform a shift from a first set of shifts, each shift of the first set being a shift by a fixed number of bits. The first set of shifts may comprise a shift by a first predetermined number of bits and a shift of zero. Each multiplexer of the second stage may be arranged to, in accordance with its second control signal, select a respective second portion of the first binary string so as to perform a shift from a second set of shifts, each shift of the second set being a shift by a fixed number of bits. The second set of shifts may comprise a shift by a second predetermined number of bits and a shift of zero. The first predetermined number of bits and the second predetermined number of bits may each be a power of 2 and may differ by a power of 2.

The multiplexers of the first stage may be arranged in a predetermined sequence according to the positions of the first portions in the input binary string they are configured to select, wherein each multiplexer belongs to a first group of the plurality of first groups such that a multiplexer of one first group precedes a multiplexer of the next first group in the predetermined sequence each time it occurs in the first stage. The multiplexers of the second stage may be arranged in a predetermined sequence according to the positions of the second portions in the first binary string they are configured to select, and wherein each multiplexer belongs to a second group of the plurality of second groups such that a multiplexer of one second group precedes a multiplexer of the next second group in the predetermined sequence each time it occurs in the second stage.

The multiplexers of the first stage may be arranged in a predetermined sequence according to the positions of the shifted first portions in the first binary string they are configured to produce, wherein each multiplexer belongs to a first group of the plurality of first groups such that a multiplexer of one first group precedes a multiplexer of the next first group in the predetermined sequence each time it occurs in the first stage. The multiplexers of the second stage may be arranged in a predetermined sequence according to the positions of the shifted second portions in the second binary string they are configured to produce, wherein each multiplexer belongs to a second group of the plurality of second groups such that a multiplexer of one second group precedes a multiplexer of the next second group in the predetermined sequence each time it occurs in the second stage. The first and second portions may comprise contiguous bits of the respective binary strings.

The binary logic circuit may further comprise one or more further stages each comprising a plurality of groups of multiplexers arranged to select respective portions of the binary string produced by the previous stage, each of the groups of multiplexers of a further stage being configured to receive a respective further control signal such that each multiplexer of a group is configured to, in accordance with the further control signal provided to that group, select a respective further portion of the binary string produced by the previous stage in order to shift the bit position of that further portion relative to the binary string produced by the previous stage.

Each multiplexer of a given one of the further stages may be arranged to, in accordance with its further control signal, select a respective further portion of the binary string produced by the previous stage so as to perform a shift from a set of shifts for the stage, each shift of the set being a shift by a fixed number of bits.

The set of shifts may comprise a shift by a predetermined number of bits and a shift of zero. The one or more further stages may be a plurality of further stages, the predetermined number of bits by which each further stage shifts further portions of the binary string produced by the previous stage is a power of 2, and by which the predetermined number of bits of consecutive further stages differ by a power of 2.

The multiplexers of each of the one or more further stages may be arranged in a predetermined sequence according to the positions of the shifted further portions in the binary string they are configured to produce, and wherein each multiplexer belongs to a further group of a plurality of further groups such that a multiplexer of one further group precedes a multiplexer of the next further group in the predetermined sequence each time it occurs in that further stage.

In embodiments, at least some of the first, second, and further portions of the respective binary strings differ in length. In embodiments, the input binary string may comprise a logically concatenated pair of binary strings. In embodiments, each binary string of the pair of binary strings may be the same binary string. In some embodiments, the binary logic circuit may further comprise a final multiplexer arranged to operate on a binary string produced by the previous stage so as to produce an output binary string, the final multiplexer being configured to cause the final multiplexer to shift all the bits of the binary string produced by the previous stage by either one bit or zero bits according to a single control signal. In some embodiments, the binary logic circuit comprises five stages of barrel shifters and employs a 5-bit shift field.

The control circuit may be operable to generate different combinations of control signals to the groups of multiplexers of the stages of the binary logic circuit so as to cause the binary logic circuit to manipulate the binary input string by: reversing the bits of the binary input string in response to a first combination of control signals; reversing the bytes of the binary input string in response to a second combination of control signals; and/or reverse the bits within each byte of the binary input string in response to a third combination of control signals.

The control circuit may be configured to provide control signals to the groups of multiplexers of the stages of the binary logic circuit so as to cause the binary logic circuit to manipulate the input binary string by reversing the bits in blocks of 2N bits within blocks of 2M bits, where M and N are integers and M>N.

The multiplexers may be arranged such that a first combination of control signals causes the binary logic circuit to perform a rotation of all bits in the binary input string and a second combination of control signals causes the binary logic circuit to perform a reversal of all bits in the binary input string.

There is provided a data processing system comprising: the binary logic circuit as claimed in any preceding claim and operable to execute a unified instruction; and a translation unit coupled to the control circuitry of the binary logic circuit and configured to, on receiving one of a predetermined set of aliased instructions, interpret the aliased instruction as the unified instruction having a predefined set of operands corresponding to the aliased instruction. The operands of the unified instruction may be processed to identify the first and second control signals used to control the stages of the binary logic circuit necessary to cause the binary logic circuit to perform the aliased instruction. There is provided a method of manipulating an input binary string at a binary logic circuit comprising a plurality of sequential stages, each stage having a plurality of groups of multiplexers, the method comprising: providing control signals to each group of multiplexers of each stage, at least two of the control signals of at least one stage of multiplexers being independently controllable; receiving each control signal at a multiplexer of the respective group; and each multiplexer: selecting an input in dependence on the control signal provided to its group, each input of the multiplexer being arranged to receive a respective portion of the input binary string for the stage to which the multiplexer belongs; providing part of an output binary string for the stage to which the multiplexer belongs so as to shift the respective portion of the input binary string by a predefined number of bits relative to the input binary string; and providing the output binary string of one stage as the input binary string of the next stage in the sequence.

Each multiplexer selecting an input may comprise each multiplexer selecting a respective first portion of the input binary string so as to perform a shift from a set of shifts for the stage, each shift of the first set being a shift by a fixed number of bits. The set of shifts for each stage may comprise a shift by the predefined number of bits and a shift of zero. The predefined number of bits by which each stage shifts portions of the binary string produced by the previous stage may be a power of 2, and the predefined number of bits of consecutive further stages differ by a power of 2.

The method may further comprise producing an output binary string for the binary logic circuit by shifting all the bits of the binary string produced by the final stage in the sequence by either one bit or zero bits according to a single control signal. The providing of the control signals may comprise providing a combination of control signals configured to cause the binary logic circuit to perform one of: reversing the bits of the binary input string; reversing the bytes of the binary input string; and reversing the bits within each byte of the binary input string.

There is provided a method of manufacturing, using an integrated circuit manufacturing system, a binary logic circuit as described herein. There is provided a method of manufacturing, using an integrated circuit manufacturing system, a binary logic circuit as described herein, the method comprising: processing, using a layout processing system, a computer readable description of the binary logic circuit so as to generate a circuit layout description of an integrated circuit embodying the binary logic circuit; and according to the circuit layout description. There is provided an integrated circuit definition dataset that, when processed in an integrated circuit manufacturing system, configures the system to manufacture a binary logic circuit as described herein.

There is provided a non-transitory computer readable storage medium having stored thereon a computer readable description of an integrated circuit that, when processed in an integrated circuit manufacturing system, causes the integrated circuit manufacturing system to manufacture a binary logic circuit as described herein.

There is provided a non-transitory computer readable storage medium having stored thereon a computer readable description of a binary logic circuit as described herein which, when processed in an integrated circuit manufacturing system, causes the integrated circuit manufacturing system to: process, using a layout processing system, the computer readable description of the binary logic circuit so as to generate a circuit layout description of an integrated circuit embodying the binary logic circuit; and manufacture, using an integrated circuit generation system, the binary logic circuit according to the circuit layout description.

There is provided an integrated circuit manufacturing system configured to manufacture a binary logic circuit as described herein. There is provided an integrated circuit manufacturing system comprising: a non-transitory computer readable storage medium having stored thereon a computer readable integrated circuit description that describes a binary logic circuit as described herein; a layout processing system configured to process the integrated circuit description so as to generate a circuit layout description of an integrated circuit embodying the binary logic circuit; and an integrated circuit generation system configured to manufacture the binary logic circuit according to the circuit layout description.

Figure 2:
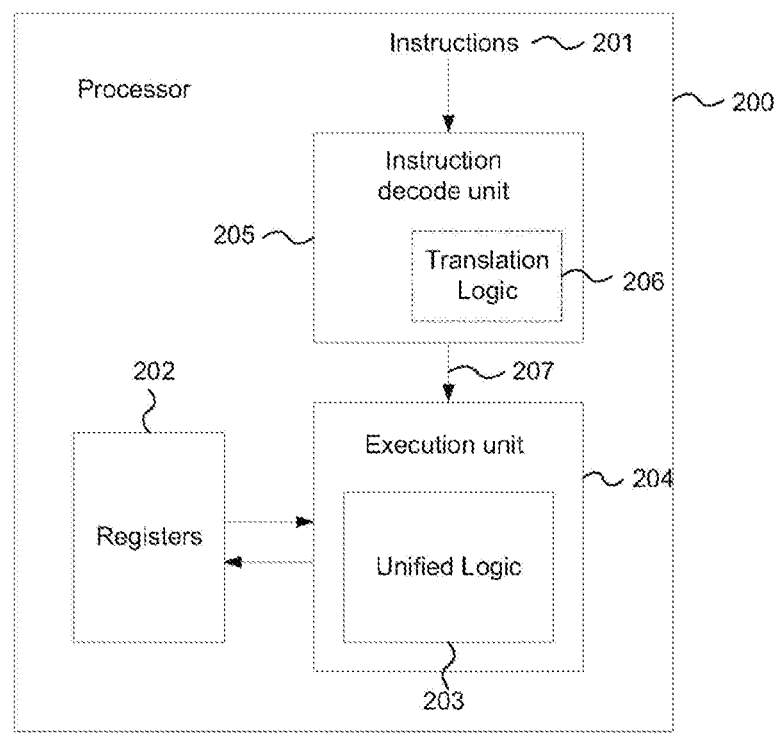
FIG. 2 is an example schematic diagram of a processor configured in accordance with the principles described herein.

FIG. 2 is an example schematic diagram of a processor 200 configured in accordance with the principles described herein. The processor 200 is configured to receive instructions 201 for execution at the processor. Each instruction typically includes one or more operands for writing to registers 202 and an opcode identifying a particular instruction which is to be executed at the processor. The processor 200 comprises an execution unit 204 having unified logic 203, which is a binary logic circuit configured in accordance with the principles described herein to perform a plurality of different instructions on binary strings—for example, on operands of a received instruction held at the registers 202. Under the control of an instruction decode unit 205, the unified logic is able to perform a predetermined set of operations which may correspond to a plurality of different instructions of an instruction set of the processor 200. In order to enable the unified logic 203 to perform different instructions, the instruction decode unit 205 is configured to generate appropriate control signals 207 for the unified logic in dependence on the particular instruction of the set received at the processor. The instruction decode unit 205 may be configured to generate appropriate control signals 207 in dependence on one or more of the operands of a received instruction of the set.

The unified logic 203 comprises a plurality of multiplexers arranged in stages, with the multiplexers of at least some of the stages being divided amongst a plurality of groups and ordered in sequence according to the group to which they belong. Each group of multiplexers of such a stage is configured to receive a control signal 207 from the instruction decode unit 205 such that at least two of the groups of multiplexers of the stage can be independently controlled by the instruction decode unit. The output binary strings generated by the unified logic in accordance with the instruction it is configured to perform may be provided to registers 202 of the processor for use by other processes running at the processor or for retrieval by units external to the processor.

The unified logic is able to perform a predetermined set of operations which may correspond to a plurality of different instructions of an instruction set of the processor 200. The processor may be configured to receive each of the plurality of different instructions of the instruction set of the processor as aliased instructions and to interpret the aliased instruction as a unified instruction having a set of one or more operands corresponding to the aliased instruction (e.g. the operands of the unified instruction may be indicated by the opcode of the aliased instruction). Such interpretation may be performed at a translation unit 206 of the instruction decode unit 205. The operands of the unified instruction may indicate to the instruction decode unit the control signals which are to be generated in order to cause the unified logic to perform the operation represented by the received aliased instruction. Thus, the unified logic may be configured to execute the unified instruction at the unified logic in dependence on control signals selected according to the opcode of a received aliased instruction.

As described, the interpretation of aliased instructions as a set of operands (and hence control signals) may be performed at the processor 200. For example, aliased instructions received at the processor may be interpreted into operands of the unified instruction at the translation unit 206 of the instruction decode unit 205, as shown in FIG. 2. More generally, the translation unit could be located anywhere at the processor or externally to the processor. In some examples, translation unit 206 may be configured to translate aliased instructions into a unified instruction comprising an opcode and its operands, and to provide that unified instruction to the processor for execution such that the processor does not receive the aliased instructions but always received its equivalent unified instruction. The translation unit could be provided in software or firmware (e.g. at an interpreter or assembler) so as to translate any one of a set of instructions into a unified instruction for execution at the processor.

In some embodiments, a plurality of aliased instructions may be translated (e.g. at an assembler or at translation logic 206) into a single unified instruction having operands for causing the binary logic circuit (e.g. unified logic 203) to perform the operations indicated by the plurality of aliased instructions (where the translation is performed in hardware—e.g. at the translation logic 206—and the translation of aliased instructions may be routed directly to the control signals for controlling the unified logic without explicitly generating the unified instructions themselves). For example, the binary logic circuits described herein may be configured to perform a combination of one or more shifts, reversals, rotations, and/or repetitions and so a set of aliased instructions representing shifts, reversals, rotations, and/or repetitions may be expressed as a single unified instruction for execution at the binary logic circuit.

The operation of the unified logic 203 shown in FIG. 1 will now be described by way of example with respect to a particular set of instructions for reversing elements within a binary string.

Figure 3:
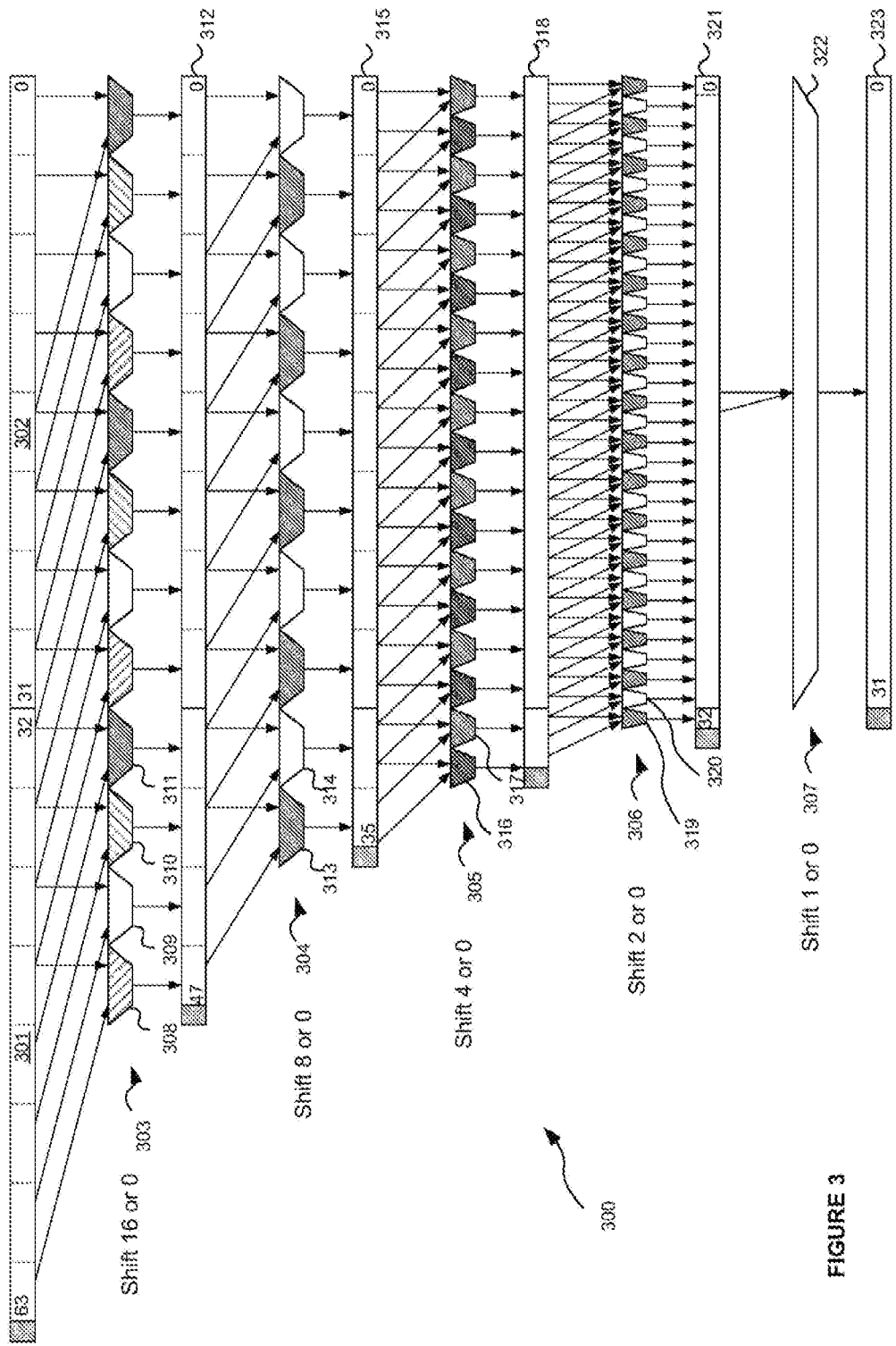
FIG. 3 is an example schematic diagram of a binary logic circuit configured in accordance with the principles described herein.

FIG. 3 is an example schematic diagram of a binary logic circuit 300 configured in accordance with the principles described herein. In this particular example, the circuit 300 is configured to operate on two 32-bit input strings 301 and 302. These input strings are held at input registers 202 and received in the operand(s) of one or more instructions received at the processor. In this particular example, the two input strings 301 and 302 are the same binary string concatenated together (logically or otherwise) so as to provide a 64-bit input, but in other examples this may not be the case. The bit positions of the repeated strings in the 64-bit input are indicated in the figure.

The binary logic circuit has five stages of multiplexers 303-307. The first stage includes twelve multiplexers divided amongst four groups labeled as 308-311 in the figure. Each multiplexer is a 2:1 multiplexer configured to select between 4-bit inputs in accordance with a control signal. The groups of multiplexers occur in a repeating sequence such that a multiplexer of the first group 308 precedes a multiplexer of the second group 309, and a multiplexer of the second group 309 precedes a multiplexer of the third group 310, and so on. The sequence repeats in that a multiplexer of the last, fourth group 311 is followed by a multiplexer of the first group 308, until all twelve multiplexers are arranged in sequence. Each group of multiplexers receives a different control signal such that different multiplexers of the same stage can be configured to select different inputs (i.e. perform a shift or not perform a shift).

Thus, in the example of FIG. 3, four control signals are provided by the instruction decode unit 205. Each multiplexer of the first stage 303 is arranged to select between a 4-bit binary string 16-bit positions to the left and a 4-bit binary string at the same bit position in the binary string represented by the concatenation of input strings 301 and 302. Thus, each multiplexer provides a 4-bit output to give a total 48-bit output 312 from the first stage. Whether or not a given multiplexer performs a 16-bit right-shift depends on which group that multiplexer belongs to and the control signal provided to that group. Typically, a control signal would be a binary 0 or 1 indicating to the multiplexers of a given group which of its two inputs to select. In other examples—e.g. where 4:1 multiplexers are used, or multiplexers have multiple outputs—other control signals may be appropriate.

The multiplexers of the second stage 304 are divided into two groups, 313 and 314, with multiplexers of each group alternating in a repeating sequence of 10 multiplexers. Each multiplexer of the second stage is arranged to select between a 4-bit binary string 8-bit positions to the left and a 4-bit binary string at the same bit position in intermediate string 312. Each multiplexer provides a 4-bit output to give a total 40-bit output 315 from the second stage. Again, each group receives a different control signal so as to allow independent control of each group of multiplexers. The instruction decode unit 205 is thus configured to provide two control signals to the second stage.

The multiplexers of the third stage 305 are divided into two groups, 316 and 317, with multiplexers of each group alternating in a repeating sequence of 18 multiplexers. Each multiplexer of the third stage is arranged to select between a 2-bit binary string 4-bit positions to the left and a 2-bit binary string at the same bit position in intermediate string 315. Each multiplexer provides a 2-bit output to give a total 36-bit output 318 from the third stage. Again, each group receives a different control signal so as to allow independent control of each group of multiplexers. The instruction decode unit 205 is thus configured to provide two control signals to the third stage.

The multiplexers of the fourth stage 306 are divided into two groups, 319 and 320, with multiplexers of each group alternating in a repeating sequence of 33 multiplexers. Each multiplexer of the fourth stage is arranged to select between a 1-bit binary string 2-bit positions to the left and a 1-bit binary string at the same bit position in intermediate string 318. Each multiplexer provides a 1-bit output to give a total 33-bit output 321 from the fourth stage. Again, each group receives a different control signal so as to allow independent control of each group of multiplexers. The instruction decode unit 205 is thus configured to provide two control signals to the fourth stage.

A final, fifth stage 307 is provided which includes a single multiplexer 322 configured to, in dependence on a control signal received from the instruction decode unit, select between right-shifting intermediate binary string 321 by 1 bit, or selecting the first 32 bits [31:0] of binary string 321. The output of multiplexer 322 provides the 32-bit output 323 of the binary logic circuit.

In the example shown in FIG. 3, the control signals of each stage may all be independent of one another. This will typically allow the binary logic circuit to perform the greatest number of different instructions, but in some implementations it may be appropriate for control signals to be shared between stages, or for the values of control signals within a stage or in different stages to have some interdependency such that the value of one control signal constrains the possible values of one or more other control signals.

Note that FIG. 3 is schematic and the intermediate outputs shown between the stages of multiplexers do not typically exist in registers or suchlike. In order to minimize circuit area, it is normally advantageous to connect the outputs of one stage to the inputs of the next stage with no intermediate logic or storage. The present example relates to a binary logic circuit for use in a 32-bit data path. It will be appreciated that the principles set out herein can be readily extended to binary strings of any length.

By dividing stages of multiplexers into ordered groups, the binary logic circuit 300 allows string elements of a predefined length to be manipulated according to their bit position in the binary string(s) on which a stage operates. Combined with an appropriate choice of the possible sizes of the bit shifts at each stage, the length of the bit portions each multiplexer of a stage operates on, and the number of groups provided at each stage, a single binary logic circuit can be configured to efficiently perform a wide range of different operations (and hence different instructions since different instructions in an instruction set typically perform different bit manipulations) merely by varying the control signals applied to the binary logic circuit. An additional instruction decode unit is required to generate appropriate control signals in response to the different instructions that might be received for execution at the binary logic circuit, but the additional circuitry required to implement this extra instruction decode unit is small compared to the cost of providing separate logic for shifting and reversing.

Figure 7:
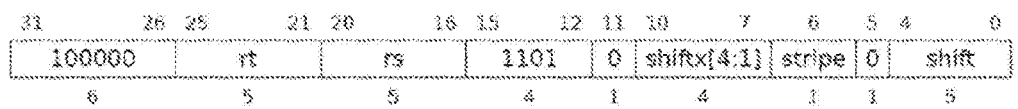
FIG. 7 shows an encoding of a ROTX instruction in an instruction set which illustrates how rt, rs, shift, and shiftx may be included in the binary instruction encoding.

Examples will now be described based on the exemplary binary logic circuit of FIG. 3. Consider a unified instruction which, depending on its operands, is able to shift, rotate, and exchange elements within a binary input string. Such an instruction could replace multiple different instructions which are typically available in processor instruction sets and that make use of dedicated processor logic to, for example, reverse all the bits in bytes of the input, rotate the words of an input, or reverse all bit pairs. The unified instruction will be defined as:

ROTX rt, rs, shift, shiftx, stripe, where ROTX is the opcode of the instruction, and rt, rs, shift, shiftx, and stripe are its operands, rs is the index of a register containing a binary value on which the instruction is to be performed, and rt is the index of a register in which the resulting binary value will be written. The operands shift, shiftx, and stripe identify the control signals that instruction decode unit 205 is to apply to the binary logic circuit of the unified logic 203 so as to achieve a desired operation. One possible binary encoding of the ROTX instruction is shown in FIG. 7, in which the positions of the rt, rs, and shift and shiftx bits are illustrated within a 32-bit binary instruction.

There could in general be any number and length of operands as appropriate to the number of control signals required for a given binary logic circuit implementation, for example, to encode a given number of possible control signals there could be multiple shorter operands or a single longer operand.

In the present example, shift and shiftx are 5-bit operands (one or more of their bits could be implied so as to improve the efficiency of the instruction representation) and stripe is a 1-bit operand. The bits or combinations of bits of the operands determine the control signals of the groups of multiplexers in FIG. 3 as follows. In the example shown in FIG. 3, a control signal of 1 causes the multiplexers of the respective group to select its shifted input and a control signal of 0 causes the multiplexers of the respective group to select its non-shifted input.

For the first stage: the multiplexers of group 308 receive shift[4] (i.e. the bit of shift in position 4), the multiplexers of group 309 receive shift[4] XOR stripe, the multiplexers of group 310 receive shiftx[4], and the multiplexers of group 311 receive shiftx[4] XOR stripe.

For the second stage: the multiplexers of group 313 receive shiftx[3], and the multiplexers of group 314 receive shift[3].

For the third stage: the multiplexers of group 316 receive shiftx[2], and the multiplexers of group 317 receive shift[2].

For the fourth stage: the multiplexers of group 319 receive shiftx[1], and the multiplexers of group 320 receive shift[1].

For the fifth stage: the multiplexer 322 receives shift[0].

It will be appreciated that only three input bits determine the values of the four control lines of the first stage. At least two but not all of the control lines of a given stage having multiple groups of multiplexers may be independently controllable.

Using the binary logic circuit shown in FIG. 3, the ROTX instruction can achieve all of the instructions in Table 1 below through appropriate choices of the shift, shiftx, and stripe operands. The instruction aliases given below are from an example instruction set. The ROTX instruction can take on the general form of: ROTX rt, rs, shift, shiftx, stripe. The 32-bit output of the operation is given for a 32-bit input whose bits are labelled as follows and split into 8-bit words:

abcdefgh ijklmnop qrstuvwx yz012345 in performing the ROTX instruction at the processor, achieve the operation represented by the aliased instruction. Appropriate shift, shiftx and stripe control signals may be determined using optional translation logic 206 in the instruction decode unit 205.

Wherever translation occurs, whether at an assembler or at a translation unit 206 of the instruction decode unit, the operands for a ROTX instruction may be inferred from the opcode of the aliased instruction it receives. Data defining the mapping of opcodes to ROTX operands (or, equivalently, the values of the control signals 207) may be stored for use by, for example, the assembler, or translation unit. A data store (not shown) may be provided to store such data for use by the translation unit. The data store may be a set of one or more registers.

Note that the ROTX instruction need not be physically generated as an opcode and a set of operands (but could be

TABLE 1

| Alias | Operation | Equivalent ROTX Instruction Output |
|---|---|---|
| BITREVW rt, rs | Reverse all bits | ROTX rt, rs, 31, 0<br>543210zy xwvutsrq ponmlkji hgfedcba |
| BITREVH rt, rs | Reverse all bits in | ROTX rt, rs, 15, 16<br>ponmlkji hgfedcba 543210zy xwvutsrq |
| BITREVB rt, rs | Reverse all bits in | ROTX rt, rs, 7, 8, 1<br>hgfedcba ponmlkji xwvutsrq 543210zy |
| BYTEREVW rt, | Reverse all bytes | ROTX rt, rs, 24, 8<br>yz012345 qrstuvwx ijklmnop abcdefgh |
| BYTEREVH rt, | Reverse all bytes in | ROTX rt, rs, 8, 24<br>ijklmnop abcdefgh yz012345 qrstuvwx |
| n/a | Reverse all nibbles | ROTX rt, rs, 28, 4<br>2345yz01 uvwxqrst mnopijkl efghabcd |
| n/a | Reverse nibbles in | ROTX rt, rs, 12, 20<br>mnopijkl efghabcd 2345yz01 uvwxqrst |
| n/a | Reverse nibbles in | ROTX rt, rs, 4, 12, 1<br>efghabcd mnopijkl uvwxqrst 2345yz01 |
| n/a | Reverse all bits pairs | ROTX rt, rs, 30, 2<br>452301yz wxuvstqr opmnklij ghefcdab |
| n/a | Reverse pairs in halves | ROTX rt, rs, 14, 18<br>opmnklij ghefcdab 452301yz wxuvstqr |
| n/a | Reverse pairs in bytes | ROTX rt, rs, 6, 10, 1<br>ghefcdab opmnklij wxuvstqr 452301yz |

For the ROTX instructions, where the final stripe operand is missing, a stripe value of zero is implied. Several of the reversal operations listed above which ROTX can be configured to perform may not currently have a dedicated alias name in an instruction set—these are indicated by n/a in the Alias column. For concision the operands are shown as decimal values above, but in hardware they would typically be provided as the binary equivalent values. For example, the shift and shiftx operands of the instruction ROTX rt, rs, 15, 16 would in binary be 01111 and 10000, respectively.

FIG. 7 shows an encoding of a ROTX instruction in an example instruction set which illustrates how rt, rs, shift, and shiftx may be included in the binary instruction encoding. The processor may be configured to receive ROTX instructions, with the shift, shiftx and stripe values being determined by the operands of the ROTX instruction. An exemplary binary encoding of the ROTX instruction is shown in FIG. 7. Aliased instructions may be translated outside the processor, e.g. at an assembler configured to interpret the aliased instruction as a ROTX instruction having operands as set out in the above table. An assembler may be provided in software. This minimizes the cost in hardware. Alternatively, the processor could be configured to receive the instruction aliases themselves (e.g. BITREVW, BITREVH, BYTEREVW, etc.) and infer appropriate shift, shiftx and stripe control signals 207 for a ROTX instruction so as to, in some embodiments, e.g. where aliased instructions are translated prior to reception at the processor). The operands or control signal values may be merely inferred at the translation unit from the received aliased instructions (e.g. the opcodes of the aliased instructions, but in some examples the operands of the aliased instructions could additionally determine the selection of the operands of the unified instruction).

Generally speaking, binary logic circuits configured in accordance with the principles described herein may be arranged to perform, by application of appropriate control signals, a reversal of blocks of length a first power-of-2 number of bits within larger blocks of length another larger power-of-2 number of bits.

Figure 4:
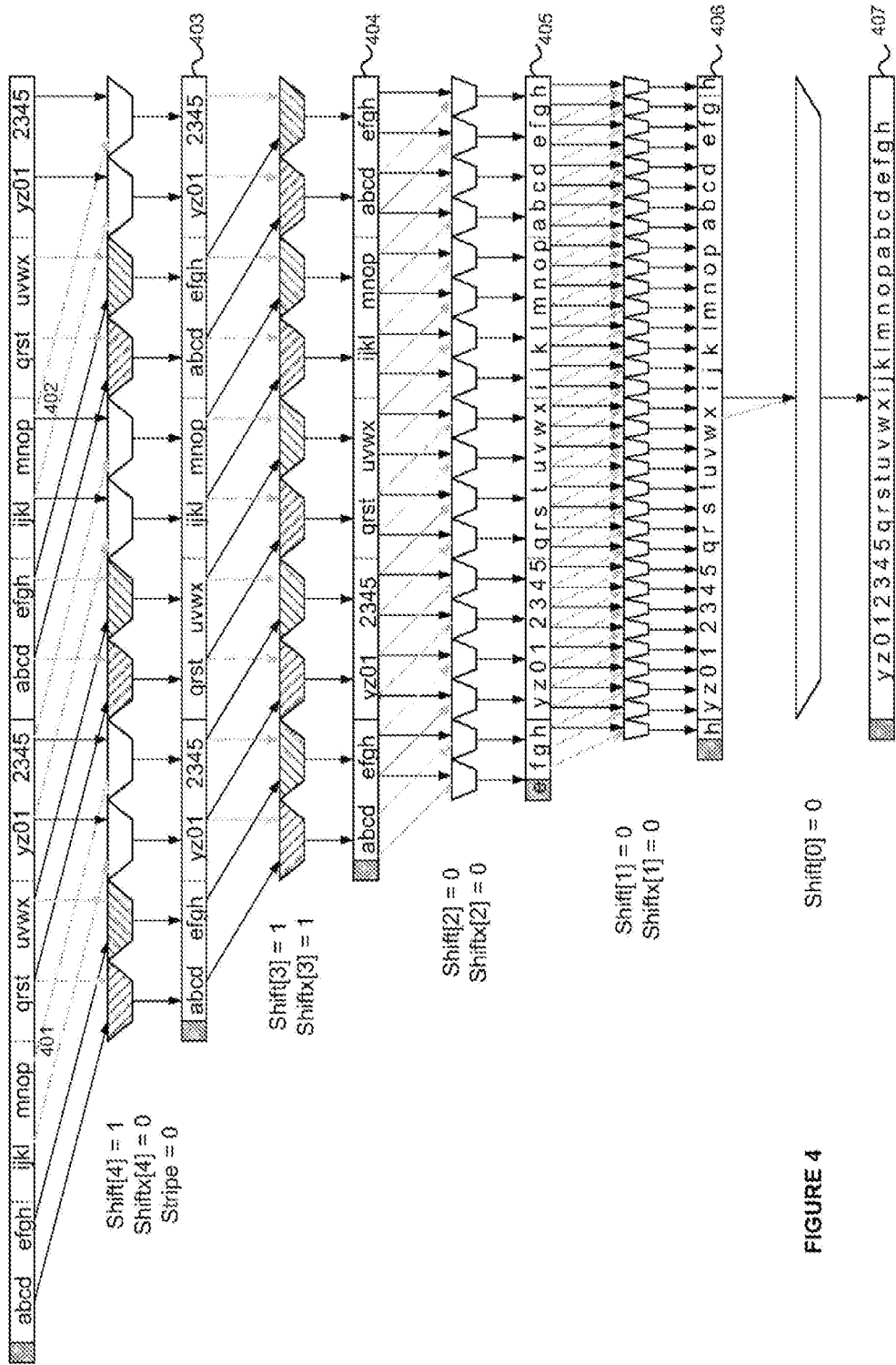
FIG. 4 illustrates an exemplary use of the binary logic circuit of FIG. 3 to perform a BYTEREVW instruction.

FIG. 4 illustrates an exemplary use of the binary logic circuit of FIG. 3 to perform a BYTEREVW instruction. On receiving a BYTEREVW instruction, the instruction is logically interpreted at the instruction decode unit to give the operands of the ROTX instruction which are appropriate to cause the unified logic to perform the reversal of all byte operations indicated by the BYTEREVW instruction. As indicated above, the BYTEREVW corresponds to ROTX operands of shift=24, shiftx=8, and stripe=0 (implied by the lack of stripe bit). In binary these values are shift=11000, shiftx=01000 and stripe=0. The groups of multiplexers therefore receive the following control signals:

For the first stage: the multiplexers of group 308 receive shift[4]=1, the multiplexers of group 309 receive shift[4] XOR stripe=1, the multiplexers of group 310 receive shiftx [4]=0, and the multiplexers of group 311 receive shiftx[4] XOR stripe=0.

For the second stage: the multiplexers of group 313 receive shift[3]=1 and the multiplexers of group 314 receive shiftx[3]=1.

For the third stage: the multiplexers of group 316 receive shift[2]=0 and the multiplexers of group 317 receive shiftx [2]=0.

For the fourth stage: the multiplexers of group 319 receive shiftx[1]=0 and the multiplexers of group 320 receive shift [1]=0.

For the fifth stage: the multiplexer 322 receives shift[0]= 0.

The groups of multiplexers which are configured to perform a shift (indicated by a 1 above) are shaded in FIG. 4.

The BYTEREVW instruction includes operand rs which represents the index of the register containing the 32-bit value on which the instruction will operate. The input value is read from register rs and duplicated to provide two 32-bit values 401 and 402 which will act as inputs to the first stage of multiplexers in the unified execution logic. The input strings 401, 402 are notated in FIG. 4 as:

abcd efgh ijkl mnop qrst uvwx yz01 2345.

The effect of the shift operations performed by each stage of multiplexers on the bits of the input strings is illustrated in FIG. 4 by the intermediate binary strings 403-406. Looking at the first stage, the first two groups of multiplexers 308 and 309 both perform a 16-bit right shift of 4-bit elements of the input strings, and the second two groups of multiplexers 310 and 311 do not perform a shift. Both groups of multiplexers of the second stage 313 and 314 perform an 8-bit right shift of 4-bit elements of the first intermediate binary string 403. All of the groups of multiplexers of the subsequent stages do not perform a shift of their respective input strings. As a consequence of the particular selection of control signals, the output string 407 provides the expected reversal of all the 8-bit bytes of the 32-bit repeated input.

To complete the operation of the instruction, this 32-bit output value will be written to the register indexed by argument RT from the instruction operands.

Figure 5:
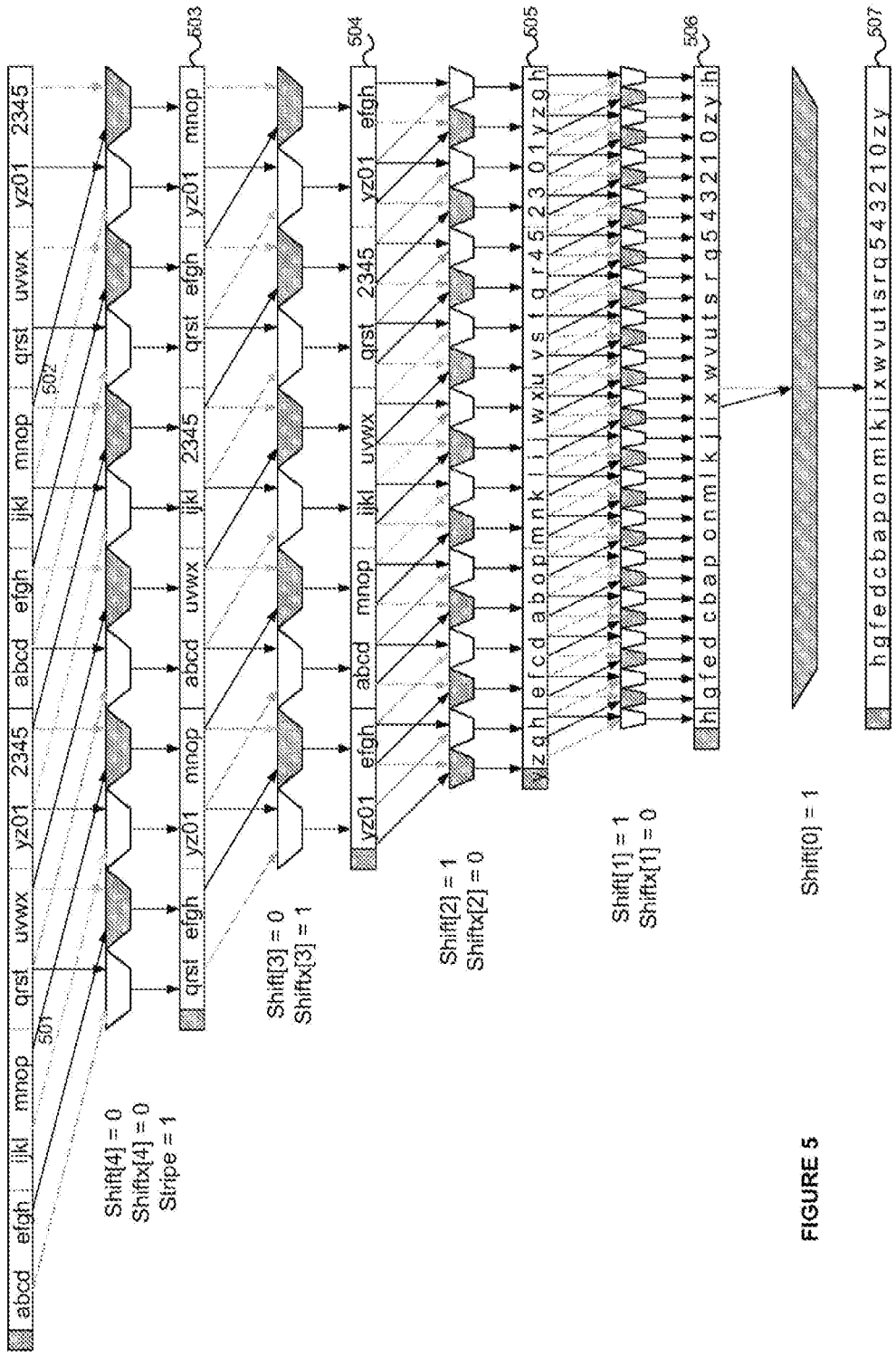
FIG. 5 illustrates an exemplary use of the binary logic circuit of FIG. 3 to perform a BITREVB instruction.

FIG. 5 illustrates an exemplary use of the binary logic circuit of FIG. 3 to perform a BITREVB instruction. On receiving a BITREVB instruction, the instruction is logically interpreted at the instruction decode unit to give the operands of the ROTX instruction which are appropriate to cause the unified logic to perform the reversal of bits in bytes operation indicated by the BITREVB instruction. As indicated above, the BITREVB corresponds to ROTX operands of shift=7, shiftx=8, and stripe=1. In binary these values are shift=00111, shiftx=01000 and stripe=1. The groups of multiplexers therefore receive the following control signals:

For the first stage: the multiplexers of group 308 receive shift[4]=0, the multiplexers of group 309 receive shift[4] XOR stripe=1, the multiplexers of group 310 receive shiftx [4]=0, and the multiplexers of group 311 receive shiftx[4] XOR stripe=1.

For the second stage: the multiplexers of group 313 receive shift[3]=0 and the multiplexers of group 314 receive shiftx[3]=1.

For the third stage: the multiplexers of group 316 receive shift[2]=1 and the multiplexers of group 317 receive shiftx [2]=0.

For the fourth stage: the multiplexers of group 319 receive shiftx[1]=0 and the multiplexers of group 320 receive shift [1]=1.

For the fifth stage: the multiplexer 322 receives shift[0]= 1.

The groups of multiplexers which are configured to perform a shift (indicated by a 1 above) are shaded in FIG. 5.

The BITREVB instruction includes operand rs which represents the index of the register containing the 32-bit value on which the instruction will operate. The input value is read from register rs and duplicated to provide two 32-bit values 501 and 502 which will act as inputs to the first stage of multiplexers in the unified execution logic.

The input strings 501, 502 are notated in FIG. 5 as:

abcd efgh ijkl mnop qrst uvwx yz01 2345.

The effect of the shift operations performed by each stage of multiplexers on the bits of the input strings is illustrated in FIG. 5 by the intermediate binary strings 503-506. As a consequence of the particular selection of control signals, the output string 507 provides the expected reversal of the bits in the 8-bit bytes of the 32-bit repeated input.

All of the other aliased instructions in Table 1 above can be performed by the binary logic circuit 300 by setting the control signals of the groups of multiplexers according to the values of the operands of ROTX set out in the table. It will be appreciated that the principles set out herein can be extended to other binary logic circuits which operate on a data path of a different width (e.g. 64 rather than 32 bits), and/or have a different number of stages, and/or have a different number of groups of multiplexers per stage, and/or provide different shifts at each stage, and/or offer three or more different shifts per stage (e.g. through the use of 3:1 or 4:1 multiplexers). The skilled person would readily understand that by varying such characteristics of a binary logic circuit, the circuit can be configured to perform different sets of operations from those set out in Table 1 above for the binary logic circuit of FIG. 3. Such operations may or may not have existing instructions in the instruction set of a processor at which the binary logic circuit is embodied. Where an operation does not have an existing instruction, the unified instruction itself (e.g. ROTX for binary logic circuit 300) may be provided with the set of operands required to achieve the desired operation. Thus, the unified instruction may be added to the instruction set of a processor so as to make it directly available to processes running at the processor.

It is envisaged that any suitable encoding of the values of control signals into the operands of a unified instruction for execution at a binary logic circuit may be used in any number of operands (e.g. a single n-bit operand may be provided of sufficient length to encode at least two independent control signals for groups of multiplexers of a given stage).

Figure 6:
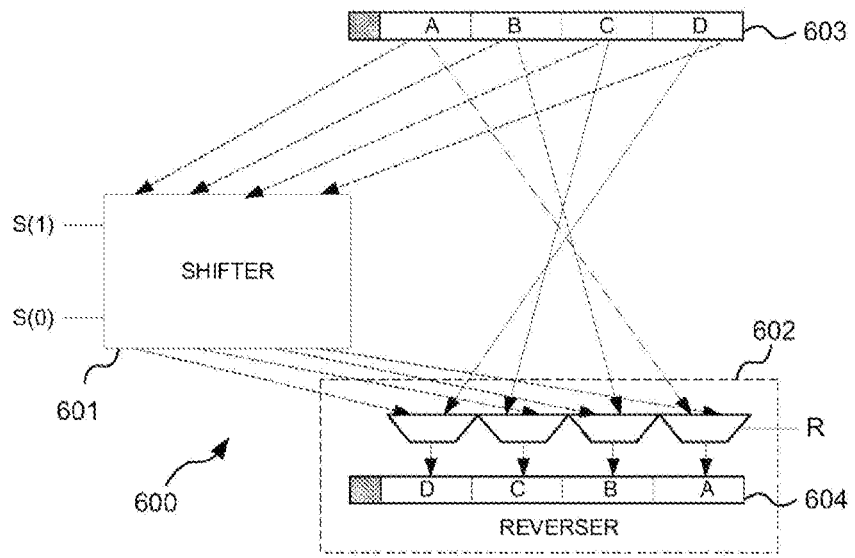
FIG. 6 illustrates a conventional approach to combining shift and reverse logic.

FIG. 6 illustrates a conventional approach to combining shift and reverse logic. In FIG. 6, example system 600 can either shift (using shifting logic 601) or reverse (using reversing logic 602) input bits 603 generating output bits 604. Creating a system which can shift or rotate requires additional multiplexers and an additional control signal R.

Figure 8:
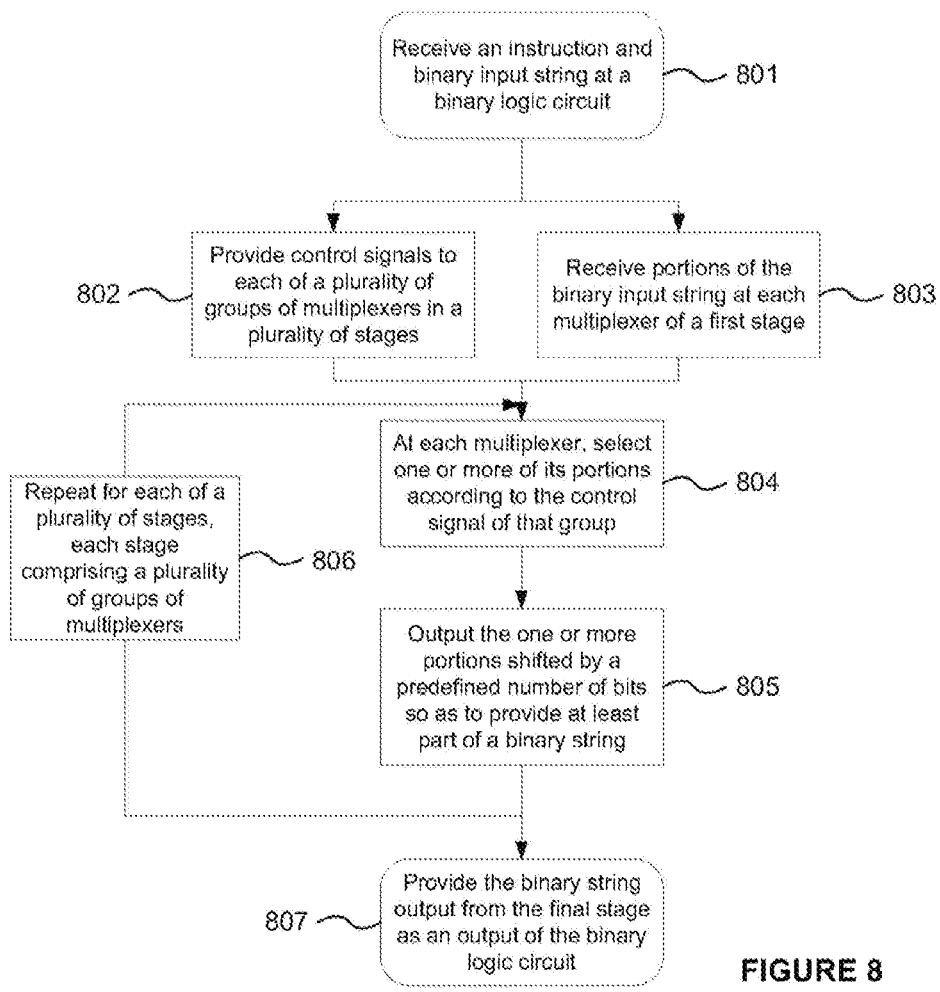
FIG. 8 is a flowchart illustrating an exemplary operation of the binary logic circuit of FIG. 3.

FIG. 8 is a flowchart illustrating an exemplary operation of the binary logic circuit of FIG. 3. An example of the method performed by a binary logic circuit comprising the instruction decode unit 205 and the unified logic 203 of FIG. 2 is shown in FIG. 8. Instructions 201 are received 801 at the instruction decode unit 205. As described above, the instructions may be either a unified instruction (e.g. from an assembler) or one or more aliased instructions which are translated at translation logic 206. The instruction decode unit is configured to provide control signals 802 to the unified logic 203 so as to configure the multiplexers of the unified logic to perform the operation(s) indicated by the received instruction. The instruction decode unit is further configured to provide 803 portions of the input binary string (e.g. as stored at registers 202) to the multiplexers of a first stage of the unified logic.

Each multiplexer of the first stage is configured to select 804 one or more of its portions according to the control signal of the group to which it belongs and output 805 those one or more portions shifted by a predetermined number of bits (which could be zero) so as to provide at least part of a binary string for the next stage of the unified logic to operate on. The parts of the binary string provided by the multiplexers of the first stage collectively provide the complete binary string on which the next stage operates.

Steps 804 and 805 are repeated 806 for each of the plurality of stages of the unified logic, each multiplexer of each stage being configured, in accordance with its control signal provided by the instruction decode unit, to select a portion of the binary string output by the previous stage. The binary string output by the final stage of the unified logic is provided as the output 807 of the unified logic and of the set of one or more operations performed by the unified logic.

The processor and binary logic circuits of FIGS. 2-5 are shown as comprising a number of functional blocks. This is schematic only and is not intended to define a strict division between different logic elements of such entities. Each functional block may be provided in any suitable manner. It is to be understood that intermediate values described herein as being formed by the stages of the binary logic circuits need not be physically captured by the circuits at any point and may merely represent logical values which conveniently describe the processing performed by the binary logic circuits between their inputs and outputs. Consecutive stages of multiplexers may be wired together such that the outputs of one stage are provided directly to the inputs of the next stage.

The binary logic circuits described herein may be embodied in any kind of circuit capable of performing binary logic operations (e.g. electronic, optoelectronic, etc.), and may be an integrated circuit.

A processor, computer, or computer system may be any kind of device, machine, or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a binary logic circuit configured to perform any of the methods described herein, or to manufacture a binary logic circuit configured according to the principles described herein. An integrated circuit definition dataset may be, for example, an integrated circuit description.

There may be provided a method of manufacturing, at an integrated circuit manufacturing system, a binary logic circuit as described herein. There may be provided an integrated circuit definition dataset that, when processed in an integrated circuit manufacturing system, causes the method of manufacturing a binary logic circuit to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a binary logic circuit will now be described with respect to FIG. 9.

Figure 9:
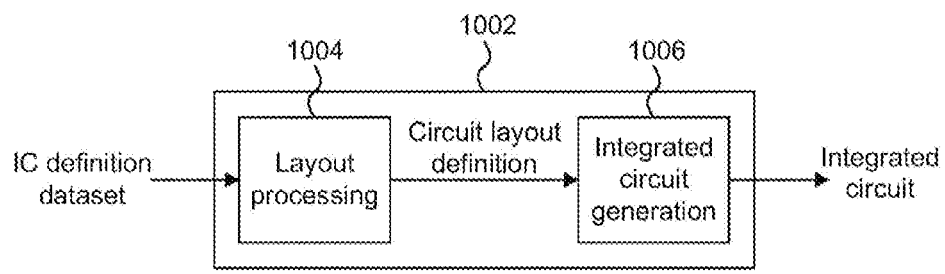
FIG. 9 is an example schematic diagram of an integrated circuit manufacturing system.

FIG. 9 is an example schematic diagram of an integrated circuit manufacturing system. The example integrated circuit (IC) manufacturing system 1002 is configured to manufacture a binary logic circuit as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a binary logic circuit as described in any of the examples herein), process the IC definition dataset, and generate an IC according to the IC definition dataset (e.g. which embodies a binary logic circuit as described in any of the examples herein). The processing of the IC definition dataset configures the IC manufacturing system 1002 to manufacture an integrated circuit embodying a binary logic circuit as described in any of the examples herein.

The layout processing system 1004 is configured to receive and process the IC definition dataset to determine a circuit layout. Methods of determining a circuit layout from an IC definition dataset are known in the art, and for example may involve synthesizing RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimize the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesizing RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a binary logic circuit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialized fashion or sharing functional blocks between elements of the devices, apparatus, modules, and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

Figure 10:
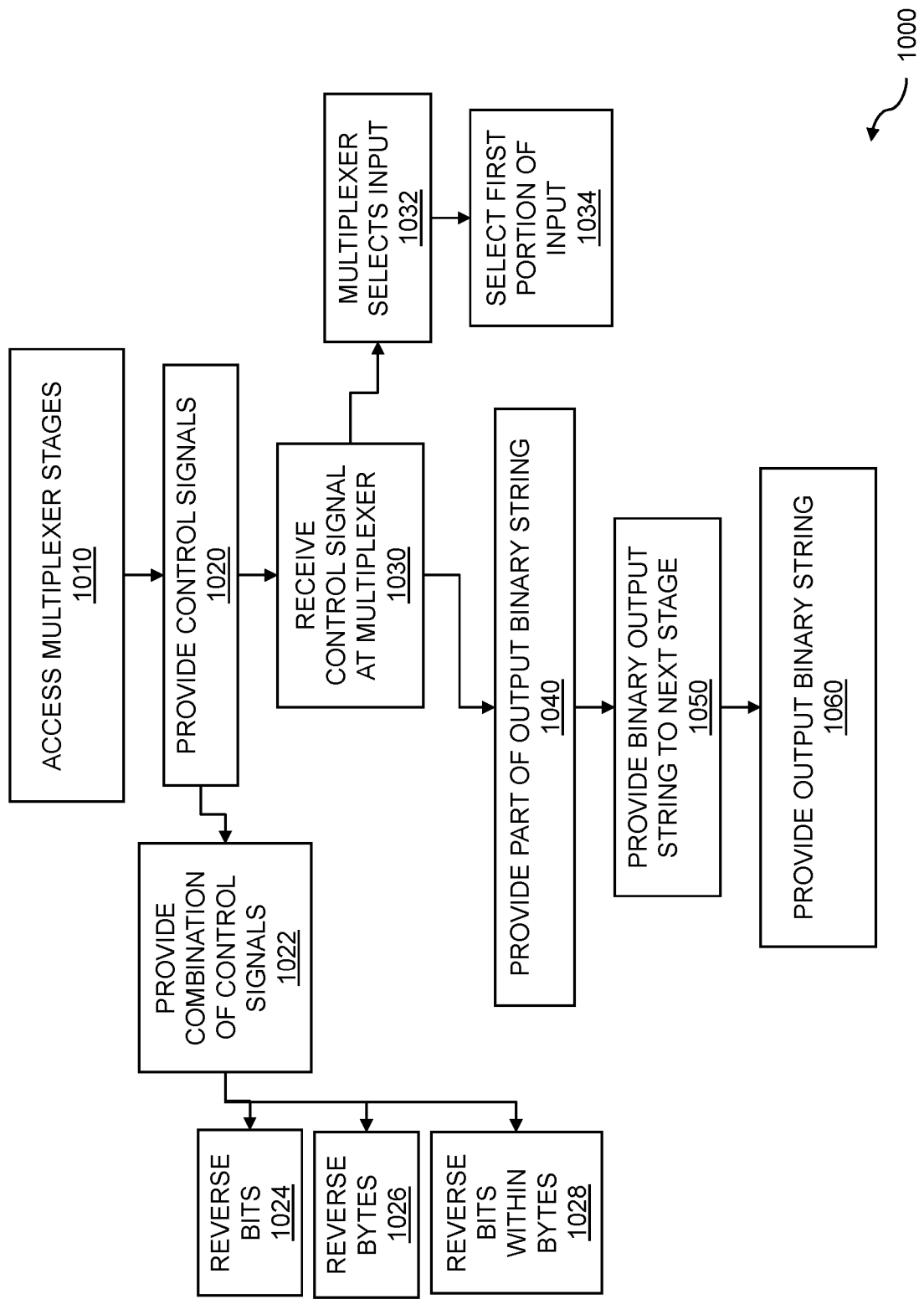
FIG. 10 is a flow diagram for unified logic.

FIG. 10 is a flow diagram for unified logic. The unified logic can include manipulating an input binary string at a binary logic circuit. The flow 1000 includes accessing a plurality of sequential multiplexer stages 1010, where each stage has a plurality of groups of multiplexers. The groups of multiplexers can be configured to operate independently for operations such as bit-oriented or byte-oriented operations, or can be configured to operate together for operations such as word-oriented operations. The multiplexer stages can include circuits within a binary logic circuit, processing elements or other elements within a reconfigurable fabric, a configurable logic circuit, and so on. The binary logic circuit, the reconfigurable fabric, etc., can be implemented with a static binary logic family, a dynamic binary logic family, and the like. The accessing can include accessing a portion of the binary logic circuit, accessing a logic circuit coupled to or in communication with the binary logic circuit, and so on.

The flow 1000 includes providing two or more control signals 1020 to each group of multiplexers of each stage, where at least two of the two or more control signals of at least one stage of multiplexers are independently controllable. The independently controllable control signals can include fire signals or done signals, interrupts, or other signals that can be used for configuring or manipulating the plurality of multiplexer states. The independently controllable signals can include synchronous or asynchronous signals. In embodiments, the providing of the control signals includes providing a combination of control signals 1022. The control signals can include the fire, done, or interrupt signals discussed, can include enable or disable signals, can include control signals for a switch or cross-bar switch, control signals for a barrel shifter or other shifter, etc. The combination of control signals can represent a code or instruction, such as microcode or a microinstruction, that can control multiplexer stages. In embodiments, the combination of control signals that is provided includes control signals that are configured to cause the binary logic circuit to perform one of a set of data manipulation instructions. In embodiments, the combination of control signals is configured for reversing the bits of a binary input string 1024. The binary input string can be a binary string provided to the plurality of sequential multiplexer states there were accessed. The binary bits that are reversed can be binary bits within bytes, words, portions of or binary fractions of words, etc. In other embodiments, the combination of control signals is configured for reversing the bytes of the binary input string 1026. The reversing bytes can be performed for a plurality of bytes, such as the plurality bytes within a word or a fraction of a word. In further embodiments, the combination of control signals is configured for reversing the bits within each byte 1028 of the binary input string. The reversing the bits within each byte can be accomplished by partitioning the input binary string into bytes prior to reversing the bits within each byte. The reversing the bits within each byte of the binary input string can be accomplished by providing the two or more control signals to each group of multiplexers of each stage of the sequential multiplexer stages.

The flow 1000 includes receiving each control signal at a multiplexer 1030 of the respective group. Each control signal can be received at a multiplexer using a variety of techniques such as broadcasting the control signals, sharing the control signal using nearest-neighbor or point-to-point communications, store-and-forward techniques, and so on. Based on receiving each control signal at a multiplexer, each multiplexer selects an input 1032 in dependence on the control signal provided to its group. The selecting an input by each multiplexer can include selecting the input binary string, a portion of the input binary string, one or more bytes within the input binary string, etc. Embodiments include receiving input of the multiplexer being arranged to receive a respective portion of the input binary string for the stage to which the multiplexer belongs. The input binary string can be partitioned among multiplexer stages, among multiplexers within a given stage, and so on. In embodiments, each multiplexer selecting an input includes each multiplexer selecting a respective first portion 1034 of the input binary string so as to perform a shift from a set of shifts for the stage, each shift of the first set being a shift by a fixed number of bits. The shifts of the first set by a fixed number of bits can include a shift up to the width of a multiplexer stage or no shift. In embodiments, the set of shifts for each stage can shift to the left or to the right by the predefined number of bits and a shift of zero (no shift). The shifting left can implement multiplication of the input binary string, and the shifting right can implement division of the input binary string. In embodiments, the predefined number of bits by which each stage can shift portions of the binary string produced by the previous stage is a power of 2, where the predefined number of bits of consecutive further stages differ by a power of 2. In a usage example, a shift three bits to the left can be accomplished by performing a 1-bit shift to the left for each stage of a set of three stages. Shifts greater than a 1-bit shift may also be performed.

The flow 1000 includes providing part of an output binary string 1040 for the stage to which the multiplexer belongs so as to shift the respective portion of the input binary string by a predefined number of bits relative to the input binary string. As discussed throughout, shifting of a portion of or all of the input binary string can be accomplished in a single stage using a shifter such as a barrel shifter, or can be accomplished using multiple stages of multiplexers. By passing part of an output binary string from one stage to another stage, shifts by bits other than zero bits or one bit can be accomplished. The flow 1000 includes providing the output binary string of one stage as the input binary string of the next stage 1050 in the sequence. The next stage in the sequence can be the next stage of multiplexers within the sequence of multiplexers. The providing the output binary string as an input binary string of a next stage enables multi-bit shifts to the left or to the right. The providing the output binary string 1060 as the input binary string to the next stage can enable operations other than shifting. As discussed previously, the other operations can include reversing bits, reversing bytes, reversing bits within bytes, and so on, within the input binary string. The flow 1000 further includes producing an output binary string for the binary logic circuit by shifting all the bits of the binary string produced by the final stage in the sequence by either one bit or zero bits according to a single control signal. All of the bits of the output binary string can be shifted based on an operation performed by all the stages, where the operation can include binary arithmetic such as multiplication or division, and so on.

Figure 11:
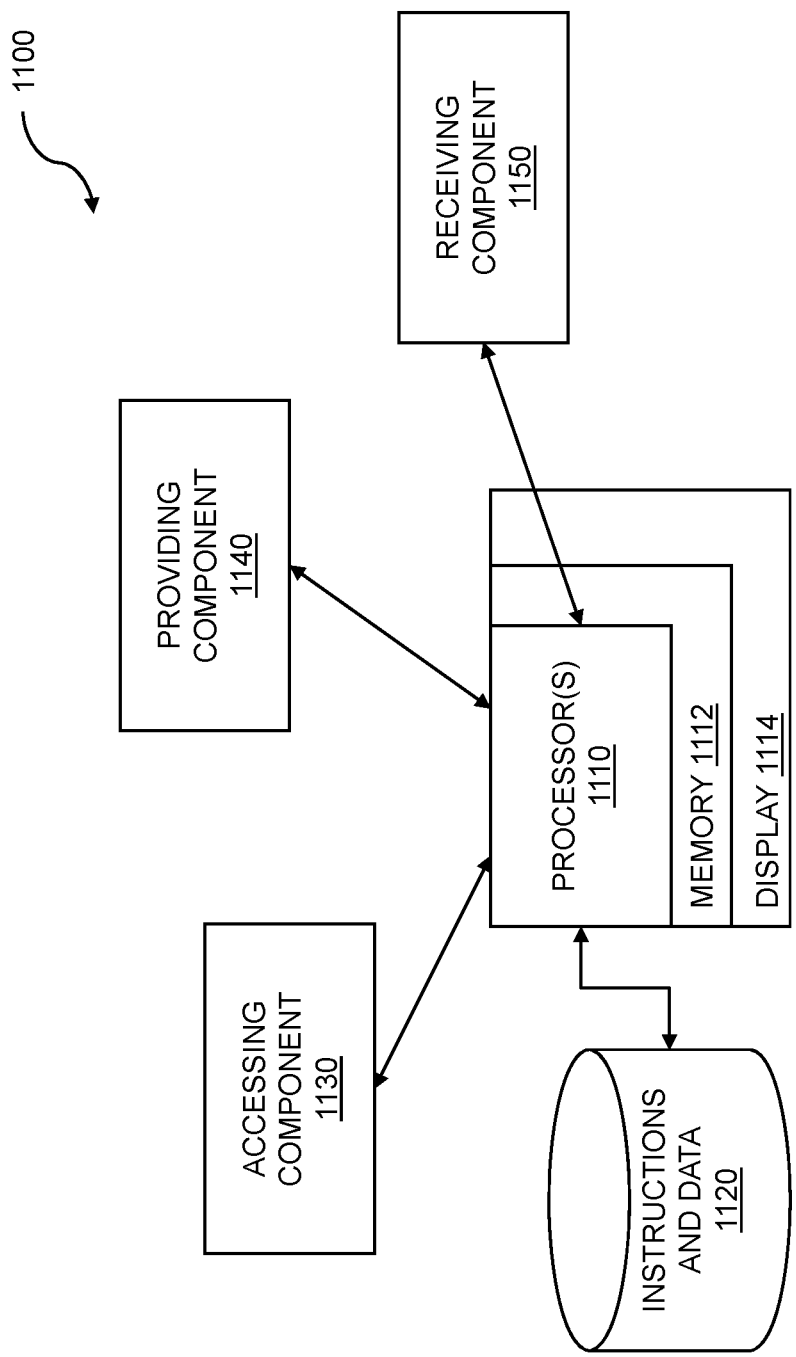
FIG. 11 is a system diagram for unified logic.

FIG. 11 is a system diagram for unified logic. The system 1100 can include one or more processors 1110 coupled to a memory 1112 which stores instructions. The system 1100 can include a display 1114 coupled to the one or more processors 1110 for displaying data, intermediate steps, instructions, program counters, instruction counters, control signals, and so on. In embodiments, one or more processors 1110 are attached to the memory 1112 where the one or more processors, when executing the instructions which are stored, are configured to: obtain access to a plurality of sequential multiplexer stages, wherein each stage has a plurality of groups of multiplexers; provide two or more control signals to each group of multiplexers of each stage, wherein at least two of the two or more control signals of at least one stage of multiplexers are independently controllable; receive each control signal at a multiplexer of the respective group, wherein each multiplexer selects an input in dependence on the control signal provided to its group, and wherein each input of the multiplexer being arranged to receive a respective portion of the input binary string for the stage to which the multiplexer belongs; provide part of an output binary string for the stage to which the multiplexer belongs so as to shift the respective portion of the input binary string by a predefined number of bits relative to the input binary string; and provide the output binary string of one stage as the input binary string of the next stage in the sequence. The system 1100 can include a collection of instructions and data 1120. The instructions and data 1120 may be stored in a database, one or more statically linked libraries, one or more dynamically linked libraries, precompiled headers, source code, flow graphs, or other suitable formats. The instructions can include instructions for controlling unified logic. The instructions can include instructions for manipulating an input binary string at a binary logic circuit. The unified logic, the binary logic, or other logic may be realized using processing elements within a reconfigurable fabric.

The system 1100 can include an accessing component 1130. The accessing component can include functions and instructions for accessing a plurality of sequential multiplexer stages, where each stage can have a plurality of groups of multiplexers. The plurality of sequential multiplexer stages or the plurality of groups of multiplexers may be implemented within a reconfigurable architecture such as a reconfigurable fabric. The accessing of the sequential multiplexer stages can be within an integrated circuit, between integrated circuits, between groups of clusters of processing elements, and so on. The system 1100 can include a providing component 1140. The providing component 1140 can include functions and instructions for providing two or more control signals to each group of multiplexers of each stage, where at least two of the two or more control signals of at least one stage of multiplexers are independently controllable. The control signals can include clocked or timed control signals, self-timed or asynchronous control signals, etc. The control signals can include fire signals, done signals, interrupts, and the like. The system 1100 can include a receiving component 1150. The receiving component can include functions and instructions for receiving each control signal at a multiplexer of the respective group, where each multiplexer selects an input in dependence on the control signal provided to its group, and where each input of the multiplexer being is arranged to receive a respective portion of the input binary string for the stage to which the multiplexer belongs. The control signals can be used to route inputs or route outputs, to select a portion of the input binary string, and so on.

In embodiments, the providing component 1140 can provide an input string or an output string in addition to the two or more control signals. The system 1100 includes the providing component 1140, where the providing component can include functions and instructions for providing part of an output binary string for the stage to which the multiplexer belongs so as to shift the respective portion of the input binary string by a predefined number of bits relative to the input binary string. In embodiments, the shifting performed by the stage to which the multiplexer belongs can implement multiplication by powers of 2 (shift left), division by powers of 2 (shift right), or other data shift or data rotation operations. The system 1100 includes the providing component 1140, where the providing component further can include functions and instructions for providing the output binary string of one stage as the input binary string of the next stage in the sequence. By providing the output binary string of one stage as the input binary string of the next stage in the sequence, larger shifts either the left or to the right can be implemented.

The system 1100 can include a computer program product embodied in a non-transitory computer readable medium for manipulating an input binary string at a binary logic circuit, the computer program product comprising code which causes one or more processors to perform operations of: obtaining access to a plurality of sequential multiplexer stages, wherein each stage has a plurality of groups of multiplexers; providing two or more control signals to each group of multiplexers of each stage, wherein at least two of the two or more control signals of at least one stage of multiplexers are independently controllable; receiving each control signal at a multiplexer of the respective group, wherein each multiplexer selects an input in dependence on the control signal provided to its group, and wherein each input of the multiplexer is arranged to receive a respective portion of the input binary string for the stage to which the multiplexer belongs; providing part of an output binary string for the stage to which the multiplexer belongs so as to shift the respective portion of the input binary string by a predefined number of bits relative to the input binary string; and providing the output binary string of one stage as the input binary string of the next stage in the sequence.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A method of manipulating an input binary string at a binary logic circuit comprising:
    accessing a plurality of sequential multiplexer stages, wherein each stage has a plurality of groups of multiplexers;
    providing two or more control signals to each group of multiplexers of each stage, wherein at least two of the two or more control signals of at least one stage of multiplexers are independently controllable;
    receiving each control signal at a multiplexer of the respective group, wherein each multiplexer selects an input in dependence on the control signal provided to its group, and wherein each input of the multiplexer being arranged to receive a respective portion of the input binary string for the stage to which the multiplexer belongs;
    providing part of an output binary string for the stage to which the multiplexer belongs so as to shift the respective portion of the input binary string by a predefined number of bits relative to the input binary string; and
    providing the output binary string of one stage as the input binary string of a next stage in the sequence; and further comprising a final multiplexer stage comprising a final multiplexer arranged to operate on a binary string produced by the previous stage so as to produce a final multiplexer stage output binary string, the final multiplexer being configured to cause the final multiplexer to shift all bits of the binary string produced by the previous stage by either one bit or zero bits according to a single control signal, wherein the final multiplexer stage comprises a 33-bit input and a 32-bit output.

2. The method of claim 1 wherein each multiplexer selecting an input comprises each multiplexer selecting a respective first portion and second portion of the input binary string so as to perform a shift from a set of shifts for the stage, each shift of the first set being a shift by a fixed number of bits.

3. The method of claim 2 wherein the set of shifts for each stage comprises a shift by the predefined number of bits and a shift of zero.

4. The method of claim 2 wherein the first and second portions comprise contiguous bits of the respective binary strings.

5. The method of claim 2 wherein at least some of the first and second portions of the respective binary strings differ in length.

6. The method of claim 1 wherein each multiplexer of the second stage is arranged to, in accordance with its second control signal, select a respective second portion of the input binary string so as to perform a shift from a second set of shifts, each shift of the second set being a shift by a fixed number of bits.

7. The method of claim 6 wherein the second set of shifts comprises a shift by a second predetermined number of bits and a shift of zero.

8. The method of claim 7 wherein a first predetermined number of bits and the second predetermined number of bits is each a power of 2 and differ by a power of 2.

9. The method of claim 1 further comprising producing an output binary string for the binary logic circuit by shifting all bits of a binary string produced by a final stage in the sequence by either 1 bit or zero bits according to a single control signal.

10. The method of claim 1 wherein the providing of the control signals comprises providing a combination of control signals configured to cause the binary logic circuit to perform one of reversing bits of the input binary string, reversing bytes of the input binary string, and reversing bits within each byte of the input binary string.

11. The method of claim 1 wherein the input binary string comprises a logically concatenated pair of binary strings.

12. The method of claim 11 wherein each binary string of the pair of binary strings may be the same binary string.

13. The method of claim 1 wherein a control circuit generates different combinations of control signals to the groups of multiplexers of the stages of the binary logic circuit so as to cause the binary logic circuit to manipulate the input binary string by reversing bits of the input binary string in response to a first combination of control signals, reversing bytes of the input binary string in response to a second combination of control signals, and reverse the bits within each byte of the input binary string in response to a third combination of control signals.

14. The method of claim 1 wherein a control circuit is configured to provide control signals to the groups of multiplexers of the stages of the binary logic circuit so as to cause the binary logic circuit to manipulate the input binary string by reversing bits in blocks of 2N bits within blocks of 2M bits, where M and N are integers and M>N.

15. The method of claim 1 wherein a first combination of control signals causes the binary logic circuit to perform a rotation of all bits in the input binary string and a second combination of control signals causes the binary logic circuit to perform a reversal of all bits in the input binary string.

16. The method of claim 1 further comprising one or more further stages each comprising a plurality of groups of multiplexers arranged to select respective portions of a binary string produced by the previous stage, each of the groups of multiplexers of a further stage being configured to receive a respective further control signal such that each multiplexer of a group is configured to, in accordance with the further control signal provided to that group, select a respective further portion of the binary string produced by the previous stage in order to shift a bit position of that further portion relative to the binary string produced by the previous stage.

17. The method of claim 16 wherein each multiplexer of a given one of the further stages is arranged to, in accordance with its further control signal, select a respective further portion of the binary string produced by the previous stage so as to perform a shift from a set of shifts for the stage, each shift of the set being a shift by a fixed number of bits.

18. The method of claim 1 wherein the binary logic circuit comprises five stages of barrel shifters and employs a 5-bit shift field.

19. A computer program product embodied in a non-transitory computer readable medium for manipulating an input binary string at a binary logic circuit, the computer program product comprising code which causes one or more processors to perform operations of:
accessing a plurality of sequential multiplexer stages, wherein each stage has a plurality of groups of multiplexers;
providing two or more control signals to each group of multiplexers of each stage, wherein at least two of the two or more control signals of at least one stage of multiplexers are independently controllable;
receiving each control signal at a multiplexer of the respective group, wherein each multiplexer selects an input in dependence on the control signal provided to its group, and wherein each input of the multiplexer being arranged to receive a respective portion of the input binary string for the stage to which the multiplexer belongs;
providing part of an output binary string for the stage to which the multiplexer belongs so as to shift the respective portion of the input binary string by a predefined number of bits relative to the input binary string; and
providing the output binary string of one stage as the input binary string of a next stage in the sequence; and further comprising a final multiplexer stage comprising a final multiplexer arranged to operate on a binary string produced by the previous stage so as to produce a final multiplexer stage output binary string, the final multiplexer being configured to cause the final multiplexer to shift all bits of the binary string produced by the previous stage by either one bit or zero bits according to a single control signal, wherein the final multiplexer stage comprises a 33-bit input and a 32-bit output.

20. A computer system for manipulating an input binary string at a binary logic circuit comprising:
a memory which stores instructions;
one or more processors attached to the memory wherein the one or more processors, when executing the instructions which are stored, are configured to:
access a plurality of sequential multiplexer stages, wherein each stage has a plurality of groups of multiplexers;
provide two or more control signals to each group of multiplexers of each stage, wherein at least two of the two or more control signals of at least one stage of multiplexers are independently controllable;
receive each control signal at a multiplexer of the respective group, wherein each multiplexer selects an input in dependence on the control signal provided to its group, and wherein each input of the multiplexer being arranged to receive a respective portion of the input binary string for the stage to which the multiplexer belongs;
provide part of an output binary string for the stage to which the multiplexer belongs so as to shift the respective portion of the input binary string by a predefined number of bits relative to the input binary string; and
provide the output binary string of one stage as the input binary string of a next stage in the sequence; and further comprising a final multiplexer stage comprising a final multiplexer arranged to operate on a binary string produced by the previous stage so as to produce a final multiplexer stage output binary string, the final multiplexer being configured to cause the final multiplexer to shift all bits of the binary string produced by the previous stage by either one bit or zero bits according to a single control signal, wherein the final multiplexer stage comprises a 33-bit input and a 32-bit output.

21. The method of claim 1 wherein the plurality of sequential multiplexer stages comprises a first multiplexer stage, a second multiplexer stage, a third multiplexer stage, and a fourth multiplexer stage.

22. The method of claim 21 wherein:
the first multiplexer stage comprises a 64-bit input and a 48-bit output;
the second multiplexer stage comprises a 48-bit input and a 40-bit output;
the third multiplexer stage comprises a 40-bit input and a 36-bit output; and
the fourth multiplexer stage comprises a 36-bit input and a 33-bit output, and wherein the fourth multiplexer stage is configured and disposed to provide input to the final multiplexer stage.

* * * * *